United States Patent [19]
Malmer, Jr. et al.

[11] 3,725,868
[45] Apr. 3, 1973

[54] SMALL RECONFIGURABLE PROCESSOR FOR A VARIETY OF DATA PROCESSING APPLICATIONS

[75] Inventors: Michael M. Malmer, Jr., Livonia; Cornelius C. Perkins, Birmingham; Donald W. Waldenmayer, Novi; Patrick J. Chowning; Leonard R. Gardner, both of Clawson, all of Mich.

[73] Assignee: Burroughs Corporation, Detroit, Mich.

[22] Filed: Oct. 19, 1970

[21] Appl. No.: 81,786

[52] U.S. Cl. ....... 340/172.5
[51] Int. Cl. ....... G06f 9/16
[58] Field of Search ....... 340/172.5

[56] References Cited

UNITED STATES PATENTS

| | | | |
|---|---|---|---|
| 3,599,176 | 8/1971 | Cordero, Jr. | 340/172.5 |
| 3,651,475 | 3/1972 | Dunbar, Jr. | 340/172.5 |
| 3,579,192 | 5/1971 | Rasche | 340/172.5 |
| 3,593,313 | 7/1971 | Tomaszewski | 340/172.5 |
| 3,248,528 | 4/1966 | Campeall | 340/Campeau |
| 3,300,764 | 1/1967 | Doelz et al. | 340/172.5 |
| 3,396,371 | 8/1968 | Waldecker | 340/172.5 |
| 3,573,855 | 4/1971 | Cragon | 340/172.5 |
| 3,577,189 | 5/1971 | Cocke | 340/172.5 |
| 3,461,433 | 8/1969 | Emerson | 340/172.5 |

*Primary Examiner*—Harvey E. Springborn
*Attorney*—Paul W. Fish, Edward J. Feeney, Jr. and Charles S. Hall

[57] ABSTRACT

An improved microinstruction data processor capable of operating as an independent processor or as a terminal unit for a large general purpose computer employing a read/write disk memory to hold both macroinstructions and microinstructions, wherein the microinstructions implement macroinstructions. The memory has a macroinstruction portion and a microinstruction portion having a changeable boundary therebetween to accomodate a variable number of microinstructions. A push-down stack facilitates microprogram branching and returning by holding microinstruction return addresses when microinstructions call for branching to microprogram subroutines. A microinstruction decoding register augmented with a microinstruction buffer register decodes a previously fetched microinstruction while a new microinstruction is fetched from memory.

3 Claims, 11 Drawing Figures

INVENTORS.
MICHAEL M. MALMER, JR.
CORNELIUS C. PERKINS.
DONALD W. WALDENMAYER.
PATRICK J. CHOWNING.
LEONARD R. GARDNER.

BY [signature]
ATTORNEY.

SMALL RECONFIGURABLE PROCESSOR FOR A VARIETY OF DATA PROCESSING APPLICATIONS

BACKGROUND OF THE INVENTION

This invention relates to a small data processing unit for business and communications application and more particularly to such a processing unit adapted to be controlled by computer generated microprograms.

Small to medium size business enterprises do not always have sufficient data processing requirements to justify the employment of a full scale general purpose data processing system. Often, the requirements of such companies can be fulfilled by electronic accounting and billing machines which can be considered to be small special purpose computers. An alternative method of handling data processing requirements of small of medium size enterprises is that of having onsite remote terminals which are coupled to a distant large scale data processing system in a time sharing manner.

Of course, in many instances, the data processing requirements of a particular business will be a mix of accounting and billing tasks and also of other processes which require larger computational capabilities. To meet this situation, terminal processors are provided which not only allow for the time sharing of a larger computer but which are also capable of performing specific processing routines. Terminal processors can also perform various preprocessing tasks such as editing and formating of data. In the case of the small business processor as well as the case of the terminal processor, emphasis is placed on the cost of the system so as to make the system available to a wide variety of smaller companies. Thus, such processors might employ disk memories which are less expensive than core memories, data paths are usually serial rather than in parallel, and the processors are provided with a limited instruction set to allow for a minimum of logic circuitry.

A particular architectural concept that allows for more flexibility in computer design, especially with the advent of monolithic integrated circuitry, has been a concept of microprograms sometimes referred to herein as microinstruction strings.

Initially microinstructions were developed for use in large scale computers. When equipped with a microprogram capability these machines were known to utilize three levels of instructions: macroinstructions, machine or ordinary instructions and microinstructions. Macroinstructions are considered machine like source language statements that can produce a variable number of machine instructions. Microinstructions, on the other hand, are the most basic or elementary machine commands such as shift, add or inhibit. Machine or ordinary instructions interface macroinstructions and microinstructions. There are the intermediate level of instructions used in compiling or assembling [Charles J. Sipple, Computer Dictionary and Handbook, Howard W. Sams Company, Inc., Indianapolis, Indiana, 1966 at 180–192].

With the advent of high speed circuitry microprogramming technology evolved and microprogramming machines developed which could eliminate the machine instruction level and therefore translate macroinstructions directly into microinstructions. This direct macroinstruction to microinstruction operation was initially mechanized in small special purpose machines but quickly evolved into larger general purpose computers such as the Burroughs B1700.

In this improved technology the relationship between macroinstruction and microinstruction has taken on new meanings. New concepts have developed such as microprogram, a program of basic or analytical instructions constructed from basic subcommands or microinstructions; and microinstruction strings, a sequence of microinstructions forming a microinstruction program or subprogram. [Charles J. Sipple, supra]

It was further recognized that various sequences of microinstructions could be formulated to carry out particular operations and separately stored in a read-write or dynamic memory as well as in a read only memory. Thus, a great variety of sequences of microinstructions could be created to carry out a great variety of routines, and, when a given processing system is designed to perform particular routines, only those required sequences of microinstructions can be stored to be called forth for execution upon the decoding of the specific individual macroinstructions. It is to be emphasized that by employing dynamically stored microinstructions or microprograms, one achieves a large reduction of logic circuitry that would otherwise be required to execute the various routines.

A particular processing unit employing the above features is disclosed in the Rasche et al. U.S. Pat. No. 3,579,192 and a particular terminal processor employing the above features is disclosed in Perkins et al. U.S. Pat. No. 3,564,509. Both of these applications are assigned to the assignee of the present invention. In each of those applications, the subject system is provided with particular microinstruction strings or programs as required for different user applications such as billing or accounting routines and in the case of a terminal processor, data formating routines. Such microinstruction strings are loaded into the memory which, in this case may be a disk memory, and can be replaced by different microinstruction strings as needed to satisfy the user's requirements. The systems thus described, can be manufactured in volume and tailored for a variety of different customer applications by supplying the appropriate microprograms.

While such systems serve the accounting, billing and terminal needs of many small enterprises, they are limited in scope because of the cost factor and do not yet approach the general purpose data processing system as might be required by the customer as his business increases in size and scope. Such limitations include small memory size and input-output capabilities, the latter of which is usually limited to paper tape and keyboard entry as well as a teletypewriter manner of printed output. Furthermore, because of the limited nature of the system's architecture, the respective microprograms must be manually generated since that architecture bears little or no relation to the architecture of large or general purpose computing systems for which compiler and assembler routines have been developed to accommodate programs written in higher level programming languages, at least one of which, Cobol, is particularly suited for business oriented data processing applications. Specifically, most small data processors are not adapted to handle automatic branching to and return from subroutines such that a program or series of programs can be viewed as a series of nested processes. Furthermore, such capability has not been provided at the microprogram level.

It is, then, an object of the present invention to provide an improved data processor controlled by changeable microprogram instructions.

It is another object of the present invention to provide an improved microprogrammed data processor that is inexpensive and yet can provide for a variety of data processing applications.

It is still another object of the present invention to provide an improved microprogrammed data processor the microprograms of which can be automatically created to implement higher level programming languages.

SUMMARY OF THE INVENTION

Improvement of processing capabilities including shorter cycle times and expanded memory will result in increased costs, where other factors are fixed. However, many design considerations can be taken into account to provide for a more general purpose processor without pricing the processor beyond the reach of many small companies. For example, the employment of changeable microprograms, to reduce the amount of required logic circuitry, is a feature which is becoming more widely employed. Furthermore, while the capacity of the main storage might be limited, provisions can be made to provide additional storage area for more complex microinstruction strings. While one might retain a disk storage for its cost advantages, provisions can be made for faster storage means for data operands and the like.

An important object however is to adapt the processor to more readily resemble larger scale general purpose processors. Most larger processors are capable of automatically handling a program branch to and return from one or more subroutines which also might employ subroutines within a subroutine. This capability is provided in the present invention at the microprogram level. One way in which a general purpose computer can be adapted to handle such nested subroutines is by the employment of push down stacks to receive subroutine return addresses when a branch occurs to allow the system to return to a corresponding ancestor routine when each level of the subroutines has been completed.

A feature, then, of the present invention resides in a processing unit have a read-write memory to contain one or more microprogram strings, which memory is addressed by a program counter and where said processor is provided with a plurality of registers arranged as a stack to hold subroutine return addresses in the reverse order from which they are entered therein so that the program being run can be viewed as a plurality of nested subroutines.

Other features reside in such a processor where the memory includes a rotating magnetic disk on which are stored microinstructions and macroinstructions where the processor is provided with a microinstruction decoding register and a microinstruction buffer register the latter of which receives a new microinstruction while the previous microinstruction is being decoded. The processor is also provided with a sufficient number of working registers to store operands and other data values that would be required during the running of a particular program so that such values would not have to be stored in the disk memory which is of a much slower speed than the working registers. Index registers are provided to address the various working registers.

Additionally, the processor is provided with a base register which specifies the boundary between the microprogram portion and the macroprogram portion of the disk memory which boundary can be dynamically changed when the microprogram strings are loaded into the memory.

DESCRIPTION OF THE DRAWINGS

The above and other objects, advantages and features of the present invention will become more readily apparent from a review of the following specification when taken in conjunction with the drawings wherein.

GENERAL DESCRIPTION OF THE PROCESSOR

Figure 1:
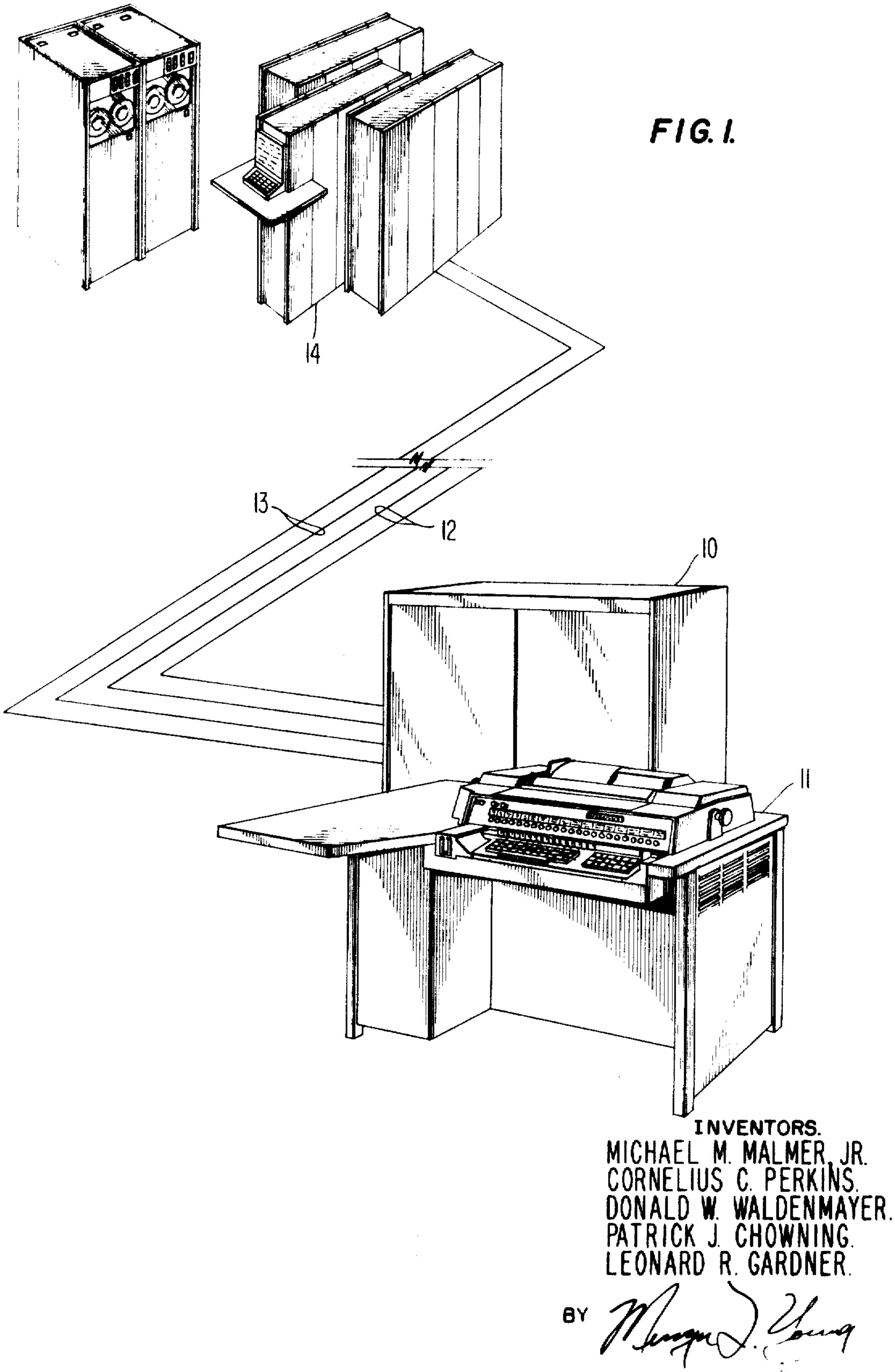
FIG. 1 is a perspective view illustrating the environment of the present invention.

The environment of the present invention is illustrated in FIG. 1 and includes processor 10 and an appropriate input-output console 11. Console 11 is provided with a printer output and keyboard and paper tape input of the type employed in an electronic billing or accounting machine. Processor 10 is also coupled by data bus 12 to various peripheral devices (not shown) and by data bus 13 and an appropriate data communication unit (also not shown but taken as used by Perkins, U. S. Pat. No. 3,564,509) to some distant general purpose data processing system 14.

Figures 2, 3:
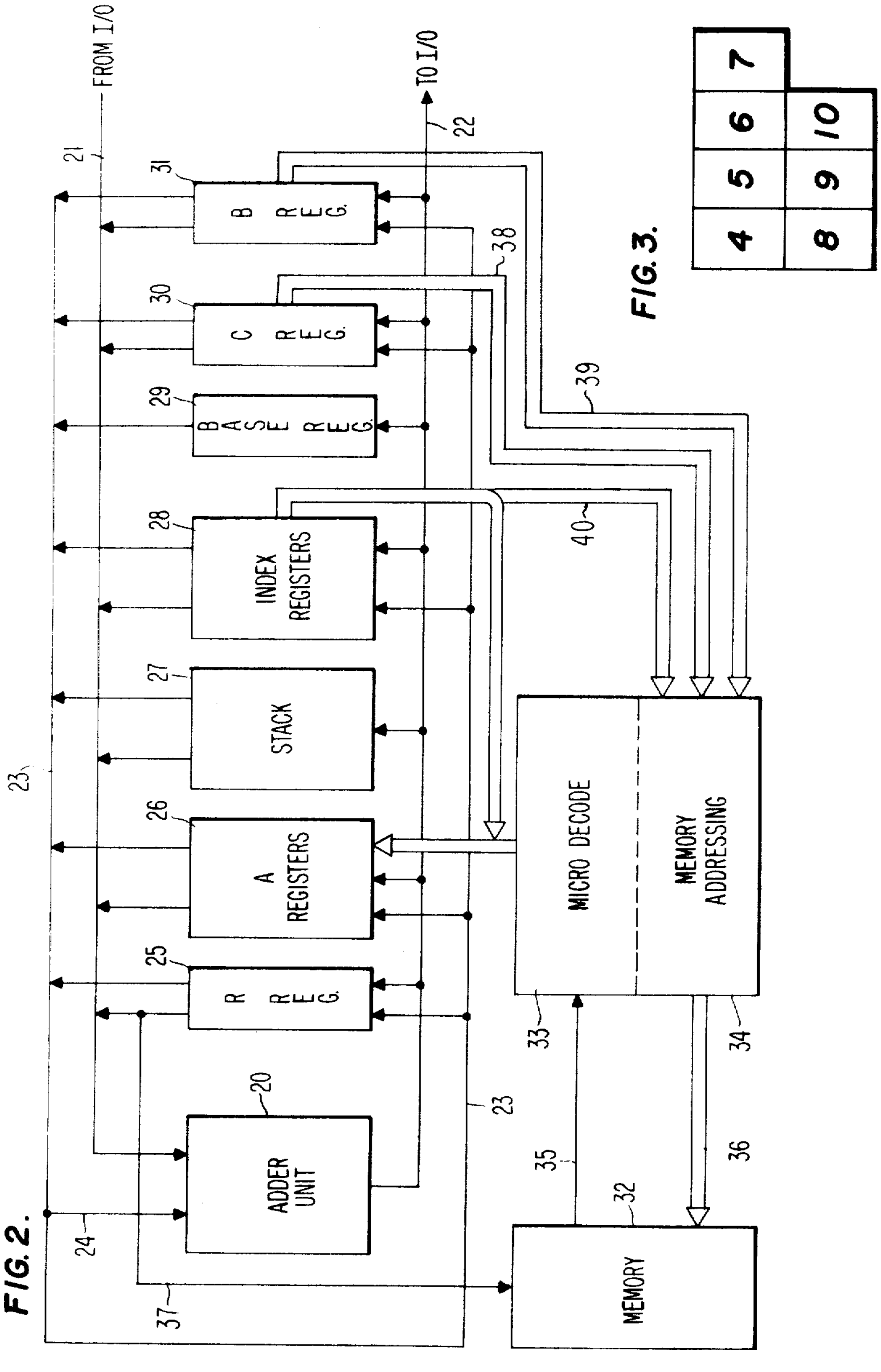
FIG. 2 is a block diagram illustrating the organization of the processor of the present invention.
FIG. 3 is a diagram illustrating the orientation of FIGS. 4–10.

The relation between various subsystems of the processor 10 is shown in FIG. 2. All of the various subsystems will be described in detail with respect to FIGS. 4–10. The processor includes adder unit 20 (FIG. 4, element 201) which is a serial adder that receives inputs from input conductor 21 and register transfer conductor 23 and supplies serial output signals by way of output conductor 22. Microinstructions, macroinstructions and operands are supplied to the processor by way of input conductor 21 through adder 20 to the respective registers and memory which will be described below. Data transfers to peripheral devices are by way of output conductor 22. As indicated in FIG. 2 by single line transfer representation, all data transfers are in a serial manner as distinct from the transfer of memory addresses 36, 38, 39, 40 which are transferred in parallel by bit and serial by word.

R register 25 (FIG. 4, element 251) is employed in the transfer of micro and macroinstructions as well as data values to memory 32 (FIG. 4, element 321) by way of serial conductor 37. A registers 26 are the principal working registers which provide storage for most data operands and are base relative addressed by micro decode unit 33 (FIG. 10) in conjunction with index registers 28.

Index registers 28 (FIG. 5, elements 281–284) as well as C register 30 and B register 31 (FIG. 61, elements 301, 302 and 311, 312 respectively) are also employed to provide additional address bits to memory addressing unit 34 to address memory 32 by way of address-in bus 36, where B register 31 is also employed to supply data to the basic I–O buffer register (not shown in FIG. 2) which in turn supplies data to the console printer.

Stack registers 27 (FIG. 5) form a push down stack as a subroutine return address stack, whereby base register 29 (FIG. 5) is used to hold the boundary address for memory 32 which boundary divides the micro portion of memory 32 from the macro portion of the memory 32. Microinstructions are adapted to address A register 26 and memory 32 to access data operands and microinstructions stored therein respectively. A microinstruction format is provided with 16 bits that are organized into codes that define the type of operation to be performed, the particular register or memory address involved, literal values if any, and special conditions (similar to that as shown in Rasche, U.S. Pat. No. 3,579,192. The microinstructions are adapted to be either self-contained or initialized instructions. Self-contained microinstructions hold all microinstruction information in the 16-bit format. Initialized microinstructions require certain set-up information from one or more of the index or working registers. (See the teachings in Rasche U.S. Pat. No. 3,579,192).

Unless a microinstruction contains a jump address, a string of microinstructions is read sequentially within a track of disk memory 32 and from track to track, beginning with the first word and syllable of the called-upon micro string. A basic timing counter (described in part B. Memory, page 24, and part C, Timing Counters, pages 28–30, of the Detailed Description of the Invention herein (also see the teachings in Rasche U.S. Pat. No. 3,579,192)) provides the time count for bit, digit, character, syllable, and word transfers between the various registers and to or from memory 32.

Index registers 28 include three index registers: I1, I2, and I3 (actually register I3 is implemented as a portion of the first word register of A registers 26). These registers facilitate the addressing of working storage (A registers 26) by data names and subscriptive data names, thus providing for the employment of data driven variables and also base relative addressing within the array. These index registers also allow for expansion of the array of A registers 26. These registers also provide common storage for counts and locations for returning address values as might be employed with hardware implementation of repetitive operations such as scan, search and multiple word operations.

To further illustrate the manner in which the various registers are employed, selected examples will now be given. During multiple word transfers, the number of words, to be transferred between memory 32 and working storage 26, will be specified by the I2 register, the starting memory address will be contained in the I3 register while the contents of the I1 register will specify the starting A word address in the working storage address 26. The contents of I1 and I2 registers are changed after each microinstruction execution. Similarly, during a search memory operation, the I3 register holds beginning memory address while the I2 register specifies the number of memory words to be searched.

Figure 5:
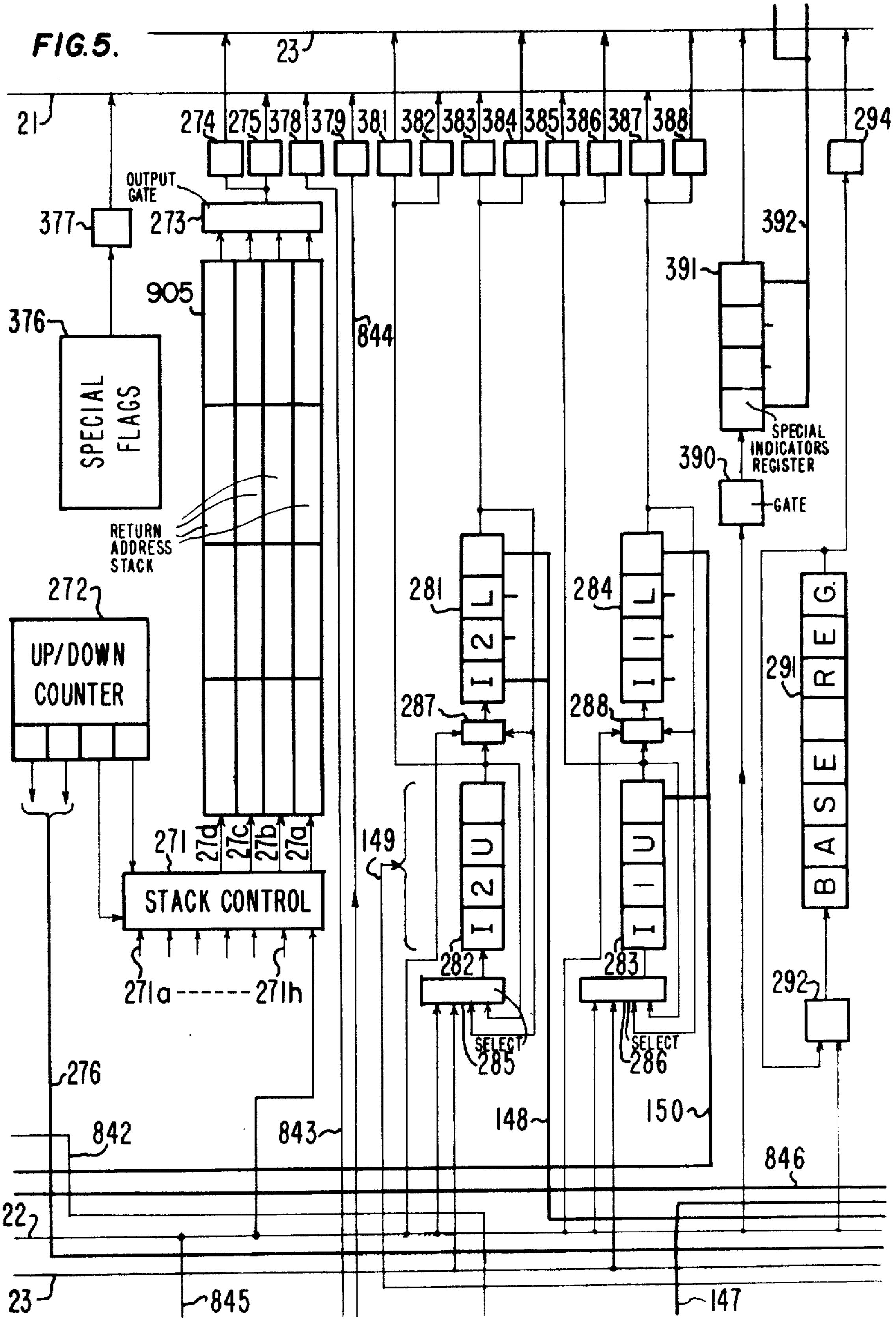
FIG. 5 is a block diagram of the stack registers, index registers and base register of the present invention.

In general, most memory accessing is effected relative to the contents of base register 29 (FIG. 5, element 291). To determine proper addressing five bits of base register 29, which specify a given track of disk memory 32, are added to five bits of the contents of C register 30. If this addition results in a carry propagate, that is to say, if the resultant sum is less than the contents originally specified in base register 29, control is transferred to a recovery routine (as described in greater detail in part B, Memory of the Detailed Description of the Invention, pages 26 et al. herein). This is in conformance with the employment of base register 29 to specify the boundary between the microinstruction portion and macroinstruction portion of disk memory 32.

Non-conditional jumps include jump, skip and enter functions. With a jump or skip function, the micro string branches to a microinstruction located at the address defined by a value (or a portion thereof) contained within the current instructions. During an enter function, the micro string branches to a microinstruction located at the address defined by the contents of the C and B register. In each example, the contents of the program counter of memory addressing unit 34 (FIG. 9) are changed or modified accordingly. The current address can be incremented by one word and stored in the next address position of stack registers 27, the stack pointer/counter (to be described below) having been incremented by one to specify the new address store of the stack registers. During an exit function, which is a subroutine return function, the micro string branches to the address specified at the last location that was entered in stack register 27. After an exit function is executed, the stack pointer/counter is decremented by one.

DETAILED DESCRIPTION OF THE PROCESSOR

Figure 4:
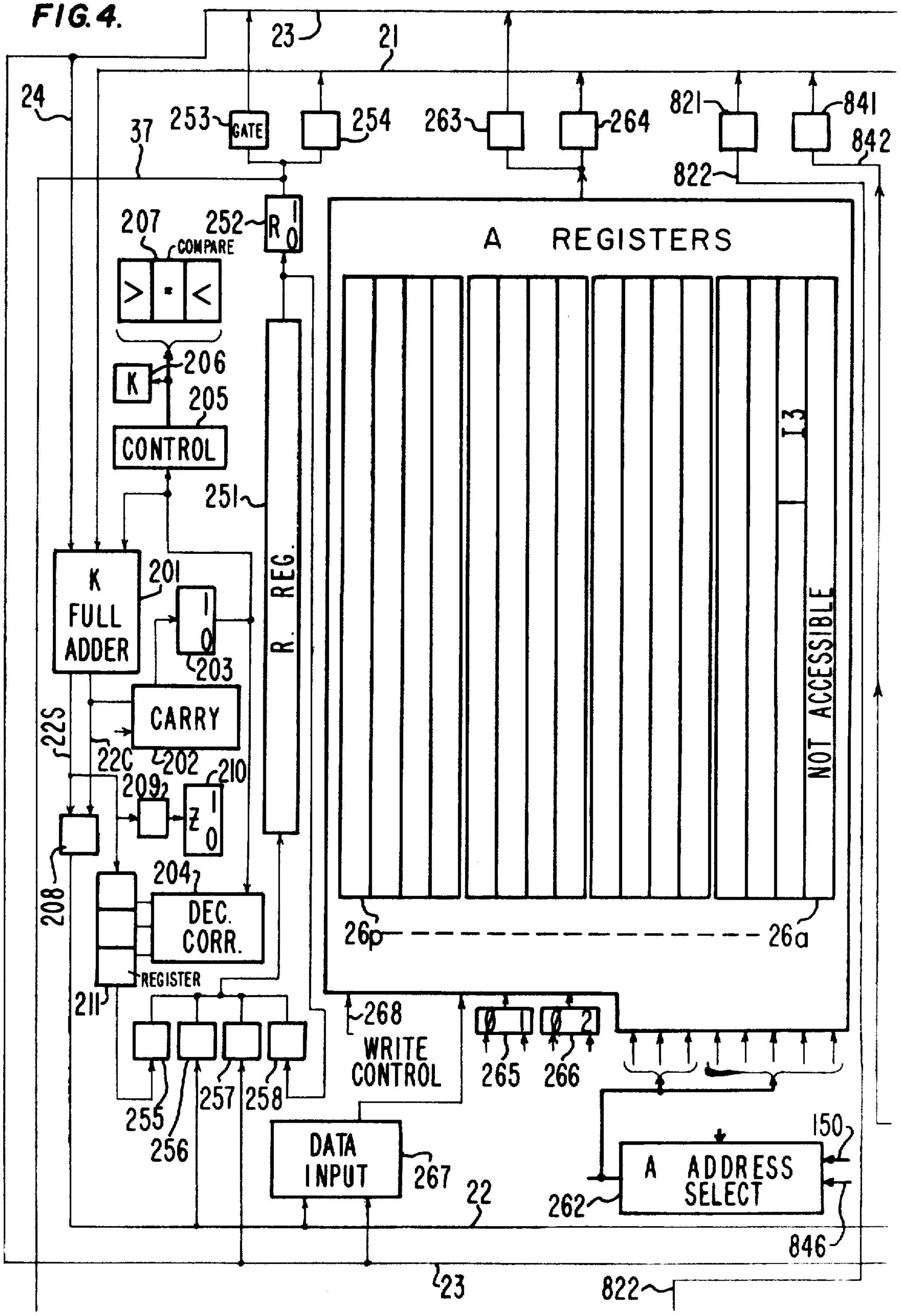
FIG. 4 is a block diagram of the adder unit and working storage of the present invention.
Figure 6:
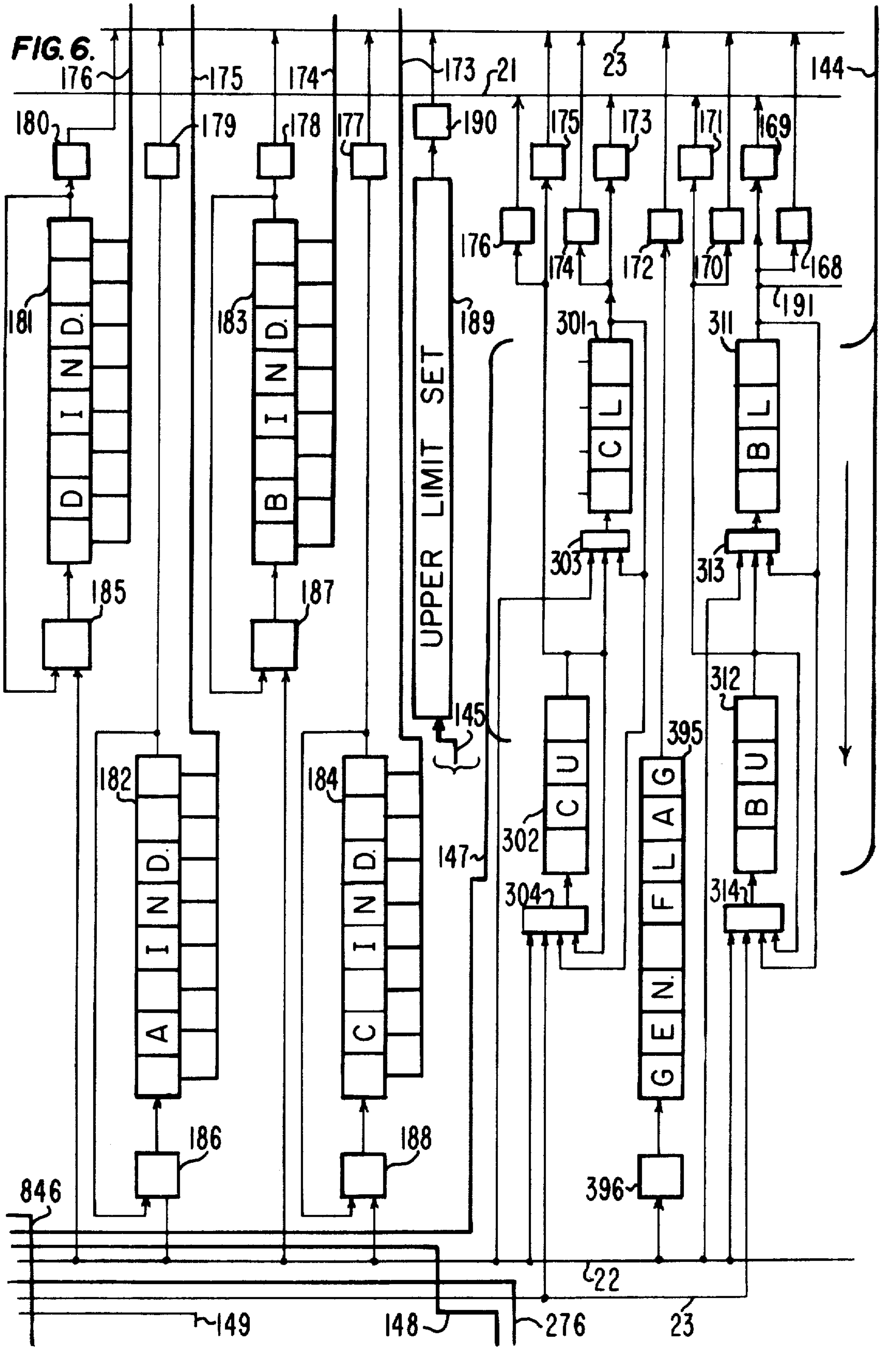
FIG. 6 is a block diagram of the C and B registers as well as the indicator registers of the present invention.
Figure 7:
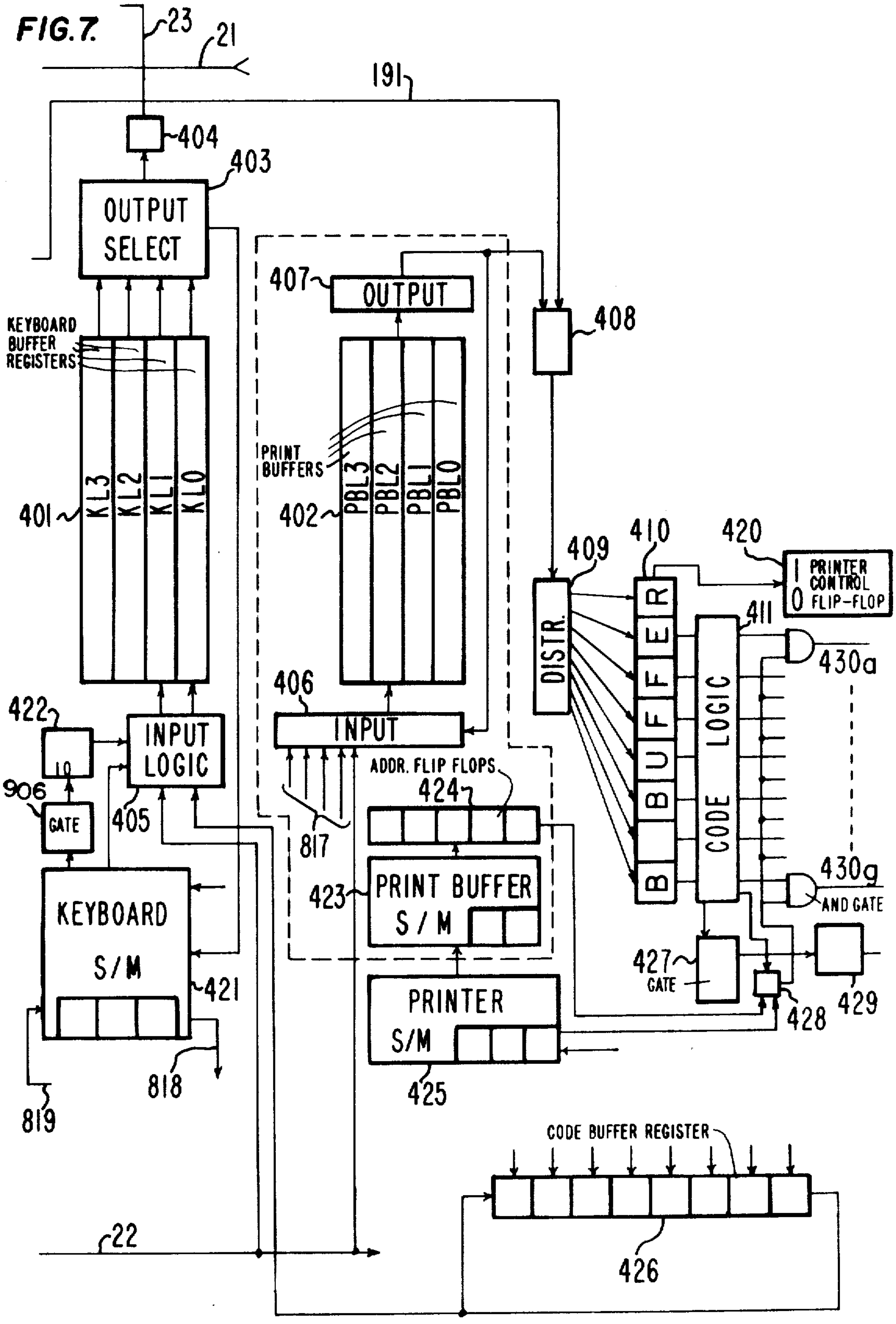
FIG. 7 is a block diagram of the keyboard and printer interfaces of the present invention.
Figure 8:
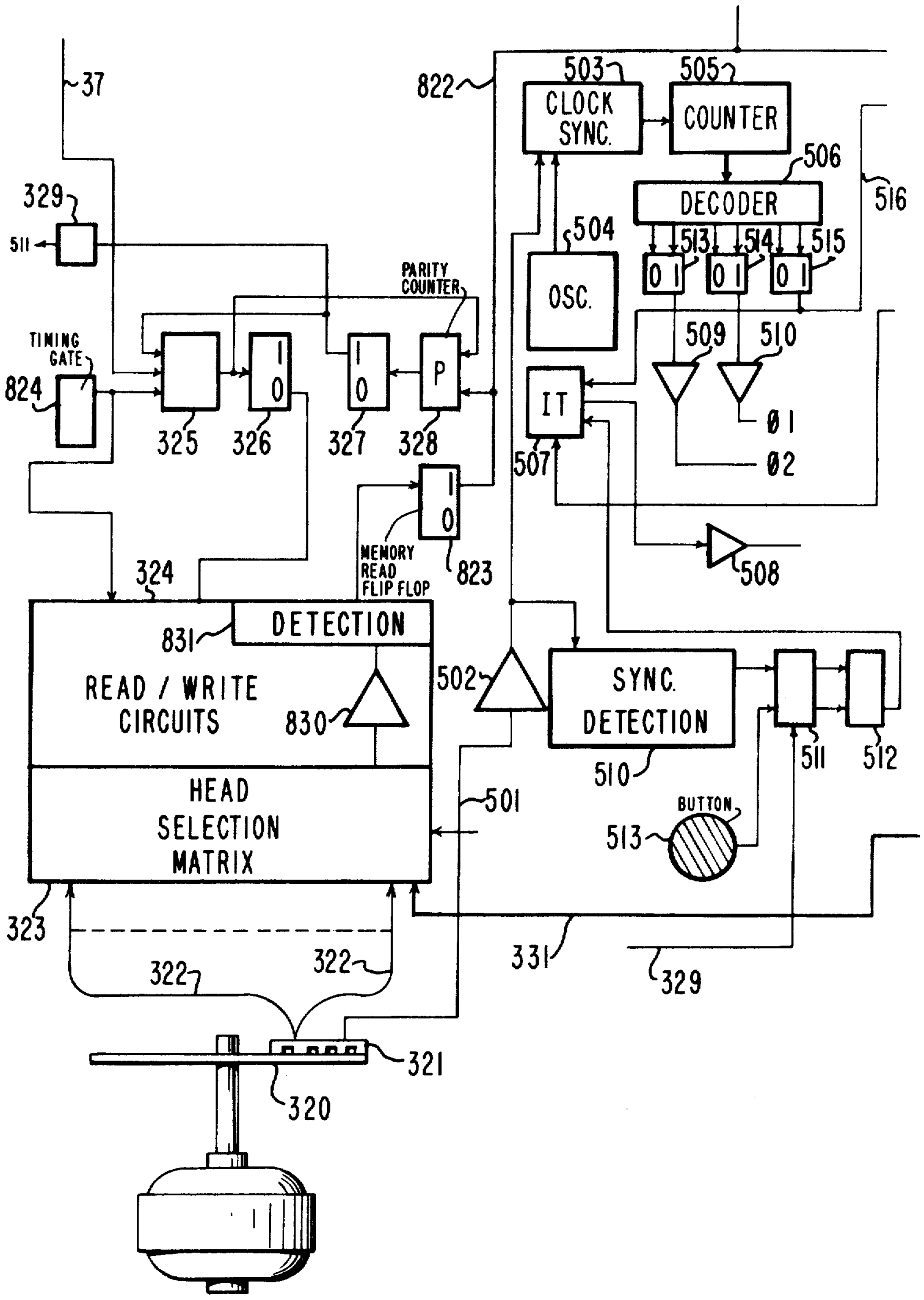
FIG. 8 is a block diagram of the memory and timing units of the present invention.
Figure 9:
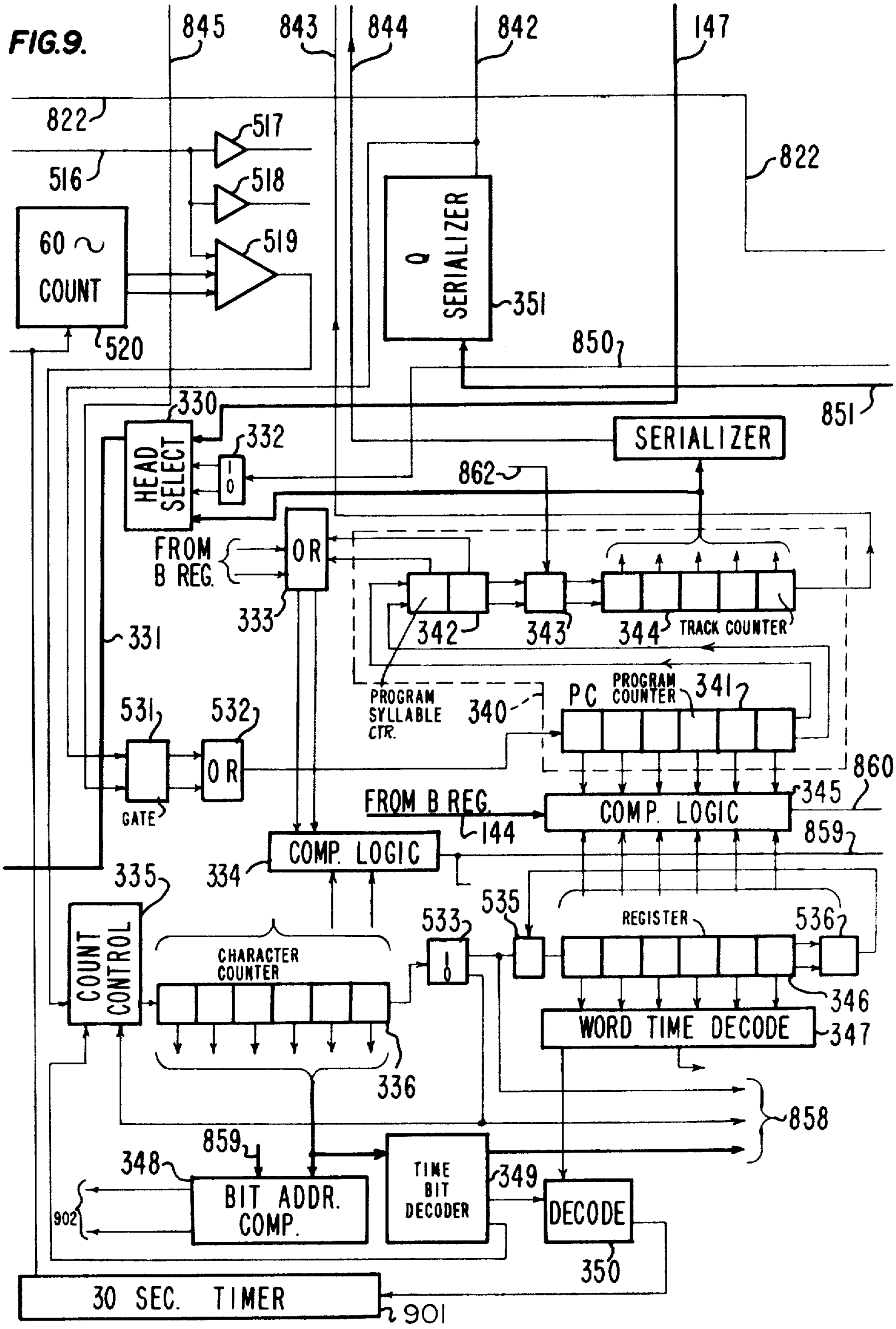
FIG. 9 is a block diagram of the memory addressing unit of the present invention.
Figure 10:
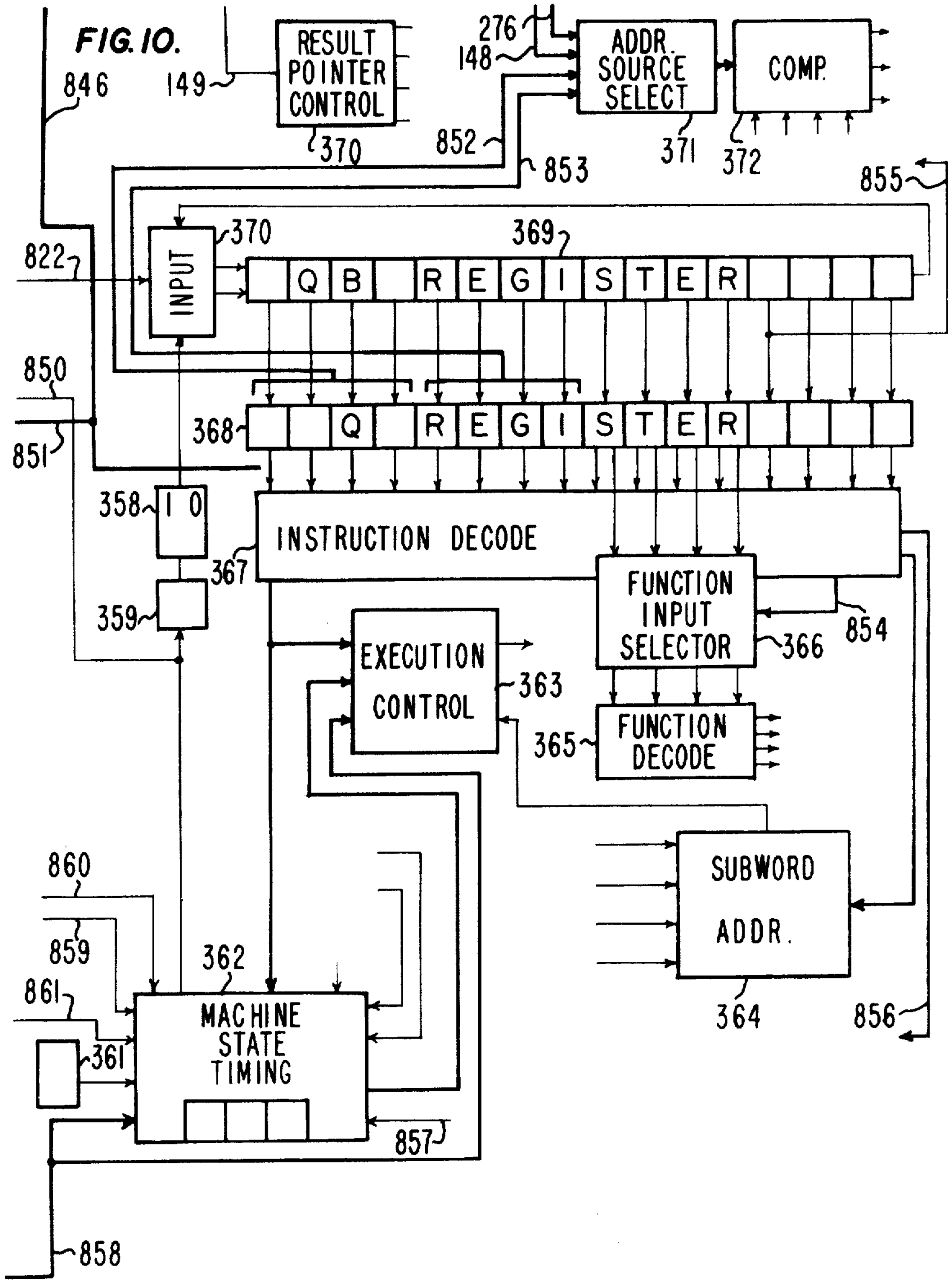
FIG. 10 is a block diagram of the micro decode unit of the present invention.

A more detailed description of the relation between the various registers and other functional components of the processor will now be given with reference to FIGS. 3–10. FIG. 4 illustrates the adder unit 20 and the working storage 26. Stack registers 27, index register 28 and base register 29 are illustrated in FIG. 5. C register 30, B register 31 and various indicator registers are illustrated in FIG. 6. The various buffer registers employed to interface with the console keyboard and printer are illustrated in FIG. 7. FIG. 8 illustrates the memory and its accessing unit as well as the timing unit of the processor. FIG. 9 illustrates the functional components of memory addressing unit 34. FIG. 10 illustrates the functional components of micro decode unit 33. The orientation of FIGS. 4–10 is illustrated in the diagram of FIG. 3. Fixture 11 illustrates the machine states of the system.

A. Adder and Registers

As disclosed in FIG. 2, data transfers are serial by bit while address information is transferred in parallel by bit, serial by digit, character or syllable as the case may be. Referring now to FIG. 4, adder unit 20 of FIG. 2 includes full adder 201 which receives inputs from input conductor 21 and register transfer conductor 23, the latter of which supplies input signals by way of conductor 24. A sum output and a carry output are received from full adder 201 by way of either of conductors 22s or 22c respectively. Either conductor 22s or conductor 22c may be connected to output conductor 22 by way of conductor select gate 208. Conductor 22c also supplies a carry signal to carry control unit 202 to set carry flip-flop 203. The state of carry flip-flop 203 is employed by compare control 205 to set K flip-flop 206 and also to set one of the compare flip-flops 207 to indicate one of three results as an answer to the programmer's inquiry; namely, greater than, equal to, or less than.

The output signals from full adder 201 are supplied by conductor 22s to register 211 where decimal correction may be performed by decimal correction unit 204. Such correction is required when the sum of two binary coded decimal digits is greater than 10 as indicated by the state of carry flip-flop 203.

As described in relation to FIG. 2, R register 25 is employed in data transfers from the various working registers and adder unit 20 (see FIG. 2) to memory 32 by way of serial conductor 37. As indicated in FIG. 4, the R register includes a 64-bit shift register 251 in which data may be recirculated from the output thereof back through gate 258 to the input of register 251. Data is inserted into register 251 from register transfer conductor 23 by way of gate 257, from output conductor 22 by way of gate 256 and from adder 211 by way of gate 255. Data is transferred out of register 251 through R flip-flop 252 to memory by way of conductor 37, to register transfer conductor 23 by way of gate 253 or to input conductor 21 by way of gate 254.

Similar to R register 25, the A registers or working storage registers are made up of 64-bit shift registers 26a, . . . , 26p. As illustrated in FIG. 4, there are 16 such working registers. However, as will be explained below, the number of such working registers can be expanded up to 256. From a programmer's point of view, the shift registers 26a, . . . , 26p would be considered as the A0, . . . , A15 registers respectively. It will be noted in FIG. 4 that the A0 register is not accessible since, for the purpose of addressing, R register 25 of FIG. 2 (shift register 251 of FIG. 4) is addressed as the A0 register even though the R register is physically distinct from the A registers. It will be further noted in FIG. 4 that a portion of the A1 register 26b is employed as the I3 index register which will be more fully described below.

The respective shift registers including shift register 251 of which the R register is formed are addressed for data transfer by addresses supplied to A address select unit 262. When it is desired to write data into this working storage, that data may be transferred from either output conductor 22 or register transfer conductor 23 to the A registers by way of data-input unit 267 when write control conductor 268 is provided with a write signal. Data may be transferred out of the specifically addressed A register to register transfer conductor 23 by way of gate 263 or to input conductor 21 by way of gate 264. It will be remembered that data is transferred into and out of the respective registers serially by bit. The timing signals to effect the serial transfer to the respective shift registers 26a, . . . , 26p are supplied to $\phi 1$ gate 265 and $\phi 2$ gate 266. The significance and source of these timing signals will be more thoroughly described below.

Also shown in FIG. 4 is gate 821 by which data is serially transferred to input conductor 21 from the memory unit of FIG. 8 which will be more thoroughly discussed in relation to that Figure. Gate 841 provides for serial transfer of data to input bus 21 from micro decode unit 33 as will be more thoroughly discussed in relation to FIGS. 9 and 10.

The functional units of stack 27 of FIG. 2 will now be described in relation to FIG. 5. As shown therein, this subroutine return address stack is formed of four 16-bit AC recirculating shift registers 27a, . . . , 27d each of which can be considered to be divided into four 16-bit segments in order to simultaneously hold up to 16 addresses. These addresses are entered into the respective shift registers by way of stack control unit 271 from output conductor 22. The particular address segment into which the address is entered or, from which it is read out, is determined by the contents of the four-bit up/down counter 272. This counter controls the states of a four flip-flop register, two bit positions of which are employed to address the particular address segment of the selected shift register, the other two bit positions being employed to transfer data indicating their states to micro decode unit 32 by way of data bus 276 as illustrated in FIG. 5. It will be remembered that this stack is to be employed as a push-down stack and thus, stack control unit 271 will normally enter the first four addresses into shift register 27a, the next four addresses into shift register 27b and so forth. Such addresses will normally be read out of the stack in a reverse order.

Also shown in FIG. 5 are two of the index registers, I1 and I2. As was described above, the third index register I3 is physically implemented as syllable O of the A1 word register in working storage 26 of FIG. 4. The I3 register is a 16-bit segment of shift register 26b of FIG. 4.

In FIG. 5, the I1 index register is divided into I1U shift register 283 and I1L shift register 284, which respectively hold the upper four bits and the lower four bits of the I1 register. The contents of these two registers can be transferred in parallel (eight bits) by way of address bus 150 to A address select unit 262 of FIG. 4. The contents of shift register 284 are recirculated from the output thereof back into that register by way of input select gate 288 while the contents of shift register 283 are recirculated from the output thereof back into that register by way of input select unit 286. Data is supplied to the two registers from either output conductor 22 or register transfer conductor 23 by way of input select gate 286. Data is specifically supplied to shift register 284 by way of input select gate 286, shift register 283, and input selector 288. These two registers can be employed as an eight bit shift register with the contents being recirculated from the output of register 284 to the input of register 283 by way of input select gate 286. Data may be transferred out of the I1L register 284 to input conductor 21 by way of gate 387 or to register transfer conductor 23 by way of gate 388. The contents of I1U register 283 may be transferred in a serial manner to input conductor 21 by way of gate 385 or to register transfer conductor 23 by way of gate 386.

In a similar manner, the I2 register is composed of I2U shift register 282 and I2L shift register 281. Again, these two registers may be considered as separate 4-bit shift registers with the contents of register 281 being recirculated back through input select gate 287 while the contents of shift register 282 may be recirculated back through input select gate 285 or the two registers may be considered as one eight-bit shift register with the contents being recirculated from the output of register 281 back to the input of register 282 by way of input select gate 285. Data may be inserted into register 282 either from output conductor 22 or register transfer conductor 23 by way of input select gate 285. Data is inserted into register 281 from output conductor 22 by way of input select gate 287.

Data may be inserted in parallel into I2U register 282 by way of bus 149 from a result pointer control unit that will be described below in reference to FIG. 10. The contents of I2L register 281 may be transferred in parallel by way of bus 148 to the address source selector of the micro code unit as will be described in relation to FIG. 10. The contents of I2L register 281 may be transferred serially to the input conductor 21 by way of gate 383 or to register transfer conductor 23 by way of gate 384. The contents of I2U register 282 may be transferred to input conductor 21 by way of gate 382 or to register transfer conductor 23 by way of gate 381.

Base register 29 of FIG. 2 is illustrated in FIG. 5 as an eight-bit shift register 291 the contents of which may be recirculated back into the register by way of input select gate 292. Data is entered into base register 291 from output conductor 22 by way of input selector unit 292 and may be transferred out to register transfer conductor 23 by way of gate 294.

Also shown in FIG. 5 is special flags serializer 376 the contents of which can be transferred to input conductor 21 by way of gate 377. The special flag information supplied by serializer 376 include indication of positioning and printing finish, carrier stall, carrier over speed, print buffer ready, keyboard loop flip-flop set, and the ready flip-flop set.

Special indicator register 391 is a four bit register the contents of which are employed to activate indicator lamps on the console keyboard. The conditions indicated thereby include alpha mode, ready condition, error condition and numeric mode. Data is entered into special indicator register 391 from output conductor 22 by way of gate 390 which contents can be directly transferred to register transfer conductor 23.

In addition to the special indicator register, there are four sets of indicator lamps on the console control panel which sets are correspondingly labeled the A, B, C, and D indicators. The registers which hold the information to be displayed by these indicators are illustrated in FIG. 6. D indicator register 181 is an eight-bit recirculating register from which data may be supplied in parallel by way of data bus 176 to the D indicator lamps of the console control panel (not shown). D indicator register 181 is serially supplied with information from output conductor 22 by way of gate 185 and the contents of this register can be serially supplied to register transfer conductor 23 by way of gate 180. Similarly, A indicator register 182, B indicator register 183, and C indicator register 184 are employed to set the corresponding sets of indicator lights on the console control panel by way of data buses 175, 174 and 173 respectively. These indicator registers can be serially loaded from output conductor 22 by way of gates 186, 187 and 188 respectively and can serially supply their contents to register transfer conductor 23 by way of gates 179, 178 and 177 respectively.

Upper limit set register 189 is employed to store a memory address which is the upper limit of the macroinstruction portion of the memory. This register is employed in conjunction with base register 291 of FIG. 5 to specify the boundary limits of the macro portion of the memory. That is to say, the contents of the base register 291, which can be changed during loading of micro strings, specifies the upper limits of the micro portion of storage and the lower limits of the macro portion of storage while the contents of upper limit set register 189 specify the upper limits of the macro portion of the memory. The contents of upper limit set register 189 are manually set in the field, although the register could be connected to output conductor 22 to allow this register to be dynamically set. When required for memory address comparison, the contents of upper limit set register 189 are supplied serially to register transfer conductor 23 by way of gate 190 under the control of clock signals supplied to register 189 of timing bus 145.

General flag register 395 is an eight-bit shift register that is employed to hold general flag or indicator bits. The first four of these bits are employed to respectively designate when a carry signal has been generated during an addition or subtraction, when a comparison is less than, when a comparison is equal to, and when a comparison is greater than. The other four bits are general purpose flag bits to be used as the programmer so desires. These flag bits are supplied to register 395 from output conductor 22 by way of gate 396 and can be read out of that register in a serial manner to register transfer conductor 23 by way of gate 172.

The other principal registers in FIG. 6 are B register 31 and C register 30 as illustrated in FIG. 2 of which C register is formed of CU register 302 and CL register 301 which respectively hold the upper and lower portions of the data word stored in the C register. Register 301 and register 302 are both four-bit shift registers the contents of which can be recirculated from the output of the register back into the input of the register. Data is entered into CU register 302 from either output conductor 22 or register transfer conductor 23 by way of input selector 304. Data is entered into CL register 301 either from output conductor 22 or from CU register 302 by way of input selector 303. The contents of CU register 302 may be supplied serially to input conductor 21 by way of gate 176 or to register transfer conductor 23 by way of gate 175. The contents of CL register 301 plus the least significant bit of CU register 302 may be transferred in parallel to the head address source select unit for addressing memory in a manner that will be discussed below. Contents of CL register 301 may be transferred serially to conductor 21 by way of gate 174 which is similar to the operation of the BL register 311. The other register, B register 31, is formed of BU register 312 and BL register 311 which respectively hold the upper and lower portions of the B register. Information may be entered into BU register 312 from either output conductor 22 or register transfer conductor 23 by way of input select selector 314. Information may be entered into BL register 311 from output conductor 22 or from BU register 312 by way of input selector 313. As indicated in FIG. 6, both BU register 312 and BL register 311 are recirculating shift registers, which recirculate through respective input select gates 314, 313 as may be seen from FIG. 6. The contents of these two registers can be transferred in parallel to the address search compare unit of memory addressing unit 34 of FIG. 2 which will be more thoroughly described below. Transfer is by way of data bus 144. In addition, the contents of BL register 311 may be transferred serially to input conductor 21 by way of gate 169 or to register transfer conductor 23 by way of gate 168. The contents of BU register 312 may be transferred serially to input conductor 21 by way of gate 171 or to register transfer conductor 23 by way of gate 170.

The specific buffer registers which interface with the keyboard and printer carrier of the control console have not been specifically illustrated in FIG. 2. However, in order to complete the description of the various registers in the processor of the present invention, these interfaces will now be described with reference to FIG. 7. As shown therein, keyboard buffer registers 401 include four 64-bit AC recirculating shift registers KL0, . . . , KL3. During normal operation, the KL2 and KL3 registers are not employed. Data may be inserted into the registers by way of input logic 405 from either output conductor 22 or from code buffer register 426. Code buffer register 426 is an eight bit recirculating register into which information may be entered directly from the console keyboard. The contents of the respective registers 401 are supplied serially to register transfer conductor 23 by way of output select circuit 403 and gate 404. Keyboard flip-flop 422 is employed to indicate which of the KL0 and KL1 registers is currently being loaded. Flip-flop 422 is set by keyboard machine state unit 421 which also is employed to test the register "pointed to" by flip-flop 422 to determine if that register is full. During keyboard entry, keyboard machine state unit 421 will continue to load characters into the register pointed to by flip-flop 422 until it is full at which time machine state unit 421 will then test the other register in the same manner. It will be remembered that the KL2 and KL3 registers are normally not employed. Machine state unit 421 is actuated by character timing signals supplied thereto by conductor 819, and can also supply control signals by way of conductor 818 to micro decode unit 33 of FIG. 2 when it is desired to enter information from the keyboard into the decoding register thereof.

Data output to the console printer is received from output conductor 22 and entered into one of four printer buffers 402 by way of input selector 406. As indicated in FIG. 7, the printer buffers are labeled PBL0, . . . , PBL3. These buffer registers are 64-bit AC recirculating shift registers which recirculate data by way of input selector 406. The contents of any one of registers 402 may be read out serially via output select unit 407 and gate 408 to distributor 409 for sequential distribution to B buffer 410. The contents of B buffer 410 may then be supplied in parallel via code logic 411 to the printer's electromechanical decoder (not shown). As indicated in FIG. 7, data may also be supplied to B buffer 410 from BL register 311 of FIG. 6 by way of conductor 191 to gate 408 and distributor 409.

The contents of B buffer register 410 are gated to the above referred to electromechanical decoder by way of AND gates **430*a*, . . . , 430*g* in accordance with timing signals received from printer machine state unit 425 (via gate 428 as shown in FIG. 7) which also supplies signals to printer buffer machine state unit 423 that in turn actuates counter 424 to control the loading into and printing out of print buffer registers 402**.

B. Memory

The memory and timing units are illustrated in FIG. 8. The circuits of two units are illustrated together because of the cooperation therebetween. As illustrated generally therein, the timing signals for the processor of the present invention are generated in response to signals received from the timing track of the disk memory which is the main memory of the processor. In this manner, the processor and the disk memory are maintained in synchronization.

As indicated in FIG. 8, the main memory includes a magnetic disk 320 which may be of a ceramic composition and is driven at high revolution. 69-bit words may be stored in 32 tracks on the disk. This disk memory may be provided with head-per track accessing and thus read-write heads 321 are coupled by read-write conductors 322 to head selection matrix 323.

As was indicated in the discussion of FIG. 2, information is supplied serially to the memory from R register 25 by way of memory input conductor 37. The read-write cycle of the memory 320 is determined by memory write flip-flop 824 the signals from which are supplied to read/write circuits 324 and also to input gate 325 which receives the serial train of information bits. This string of bits is then supplied by way of flip-flop 326 to read-write circuits 324 and to an appropriate one of the head conductors 322 as selected by head selection matrix 323.

On readout, the particular track-head conductor 322 selected by head selection matrix 323 is coupled by way of amplifier 830 to detection unit 831. The series of bit pulses thus produced are employed to determine the state of memory read flip-flop 823 to thus transmit a series of digital pulses over conductor 822 to either micro decode unit 33 of FIG. 2, input control 370 for QB register 369 of FIG. 10, as will be described below, or to input conductor 21 by way of gate 821 as was described with reference to FIG. 4. That is to say, if the data read out of memory is a microinstruction, it is transmitted to the micro decode unit 33; however, if the data read out represents a macroinstruction or a literal, it is transferred by way of input conductor 21 and adder 20 to appropriate registers as was described above.

On data transfer to memory, the number of ONE bits in the string are counted by parity unit 328, and if even, a ONE parity bit is added to the string. On read-out, the number of ONE bits (including parity) is counted, and if even, a parity error signal is sent from parity flip-flop 327 to gate 329.

The memory may be addressed with information initially obtained from B register 31 and C register 30 of FIG. 2 which registers were described in detail in relation to FIG. 6. The contents of the C register are employed to specify the particular track, or rather the particular track head, to be employed in memory accessing and the contents of the B register specify the particular word and syllable in this selected track. Referring now to FIG. 9, the contents of the B register are received by way of bus 144 by comparison logic 345 for comparison with the contents of word timing counter 346. When a comparison occurs, a signal is sent to the machine state timing unit 362 (see FIG. 10) and causes the read-write circuits 324 of FIG. 8 to receive the data word from the selected track of the disk memory. The particular track head is selected for this purpose in accordance with an address received by head selection matrix 323. Referring again to FIG. 9, the head address is supplied over address bus 331 from head select unit 330 in accordance with the contents supplied to head select unit 330 from the C register of FIG. 6 by way of data bus 147. The memory also may be addressed at a particular word or syllable from an address obtained by the decoding of a microinstruction. As illustrated in FIG. 9, this address is received over address bus 851 as a parallel address which is serialized by Q serializer 351 and supplied to word register 341 of program counter 340 by way of gates 531 and 532. The manner in which the word time counter 346 is synchronized with the memory will be more thoroughly described below. Word counter 346, parity flip-flop 533 and character counter 336 form the basic timing counters of the processor of the present invention.

When information from the B register has not been entered into comparator logic 345, word addressing of memory will take place by comparison of the contents of program word counter 341 of the program counter 340 and the word time counter 346. For microinstruction addressing, additional address bits must be compared since the microinstruction is only 16 bits long, that is to say, it comprises two characters. Thus, for microinstruction addressing, the least two significant bits received from the B register, or the contents of program syllable counter 342 of program counter 340 are transferred by OR gate 333 to syllable comparator logic 334 for comparison with the two most significant bits of bit time counter 336. These two most significant bits will just indicate the least two significant characters or the least syllable of a word count. When such a comparison occurs, a micro address compare signal is transmitted on conductor 859 to the machine state timing unit described below to thus cause the memory to access the selected track on the disk at the syllable level.

Unless the memory addressing is under the control of the B and C registers as described above, such addressing will be in a sequential manner under control of program counter 340 of FIG. 9. To this end, track counter 344 designates a particular one of the 32 addressable tracks which address may be directly transferred to head select unit 330. Syllable counter 342 specifies a particular one of four syllables in a given word which may be transferred by way of OR gate 333 to syllable comparator logic 334 and, as indicated above, a comparison causes the memory to access that syllable in the select track. Word counter 341 designates one of 64 words in the selected track. As indicated in the description above, when the contents of counter 341 compare with the contents of word time counter 346, word comparator logic 345 causes the memory to access that word in the particular selected track. In this manner, upon incrementation of the respective counters from a syllable to a word to a track level, the memory may be accessed sequentially by syllable and then by word along a given track and sequentially by track as each track has been accessed.

It will be appreciated that, while the above description has been directed toward a single disk memory, the processor of the present invention can employ a plurality of such memories, either in a bank or in a hierarchial manner.

C. Timing Counters

It will be remembered as stated previously, that all data transfer is serial by bit with so many bits (8) forming a character and so many characters (8) forming a word. In the processor of the present invention, four bits constitute a digit, two digits constitute a character, two characters constitute a syllable and four syllables constitute a 64-bit word. Because of the serial by bit nature of the data transfer, appropriate timing signals are supplied to specify the time divisions employed in the word transfer.

Again referring to FIG. 9, the basic timing counter is comprised of the word time counter 346, and bit timing counter 336. As illustrated in FIG. 9 each of these counters is formed of a plurality of flip-flops which define significant bits. Thus, viewing from the left, the first three flip-flops define the least significant bits which go to make up a character; and while the remaining flip-flops also define bit levels of higher orders they can be viewed as actually representing characters. The states of the flip-flop which make up word time counter 346 are decoded by word time decoder 347 while the states of the flip-flops which make up the bit time counter 336 are decoded by bit time decoder 349. The signals thus generated by these decoders are transferred by bus 858 to the machine state timing unit to be described below.

The respective counters thus described are incremented on a bit basis by count control unit 335 in response to timing signals generated from the timing track of disk memory 320 of FIG. 8. This timing track contains 4,556 bits which will be read every revolution of the disk, which bit signals are amplified by read amplifier 502 then applied to the clock synchronization unit 503. One particular bit on the timing track is significantly longer than the other bits and this synchronization bit is employed to insure synchronization of the various timing clocks in the processor with the disk memory. The bit signals received by clock synchronization unit 503 are employed to gate timing signals received from oscillator 504 to timing counter 505. Oscillator 504 is a 10mHz oscillator and timing counter 505 is a four flip-flop counter to respectively generate one, two, four and eight timing signals for each bit signal received from the timing track of disk memory 320. These signals are decoded by decoder 506 to respectively set and reset flip-flops 513, 514 and 515. The output signal from flip-flop 515 is the basic machine clock signal which is supplied by conductor 516 to respective timing amplifiers 517–519 of FIG. 9 and also to the initiate signal unit 507 of FIG. 8. This latter unit generates an initiate signal to reset the machine state timers by way of a signal supplied to amplifier 508, whenever the disk memory completes one complete revolution as determined by the detection of the synchronization bit described above by synchronization detection 510, when there occurs manual reset of the keyboard reset button 513, or when there is detection of parity error from gate 329.

Decoder 506 of FIG. 8 is also employed to supply two phase signals to phase amplifiers 509 and 510 as required for the various AC shift registers which form the working storage, the subroutine return stack and the keyboard and printer buffer registers which were described above.

At the very beginning of machine operation, initiate signal unit 507 (see FIG. 9) is inhibited from generating an initiating signal to start the machine state sequence until thirty seconds have elapsed to allow the rotating disk memory to achieve its proper rotational speed.

D. Microinstruction Decode

Referring to FIG. 10, the microinstruction decode unit will now be described. As indicated therein, a fetched microinstruction is received from the memory by way of serial conductor 822 and loaded into Q buffer register 369 by way of input control 370. Q buffer register 369 is a 16 bit flip-flop shift register that receives the next microinstruction from memory while the previous microinstruction is being executed from Q register 368. The contents of Q buffer register 369 will be continuously recirculated back through input control 370 until the beginning of the next word time when the contents of the Q buffer register 369 are loaded into Q register 368.

Normally, a microinstruction is loaded from Q buffer register 369 into Q register 368 during each word time. However, certain microinstructions will take more than one word time to execute. This latter class of microinstructions includes skip and conditional jump instructions as well as those microinstructions which require synchronized signals to sequence through the timing states. The synchronized microinstructions must be followed by a jump microinstruction which will be fetched and loaded into the Q buffer register in the same manner as a regular microinstruction, except, that now the instruction will be recirculated in the Q buffer register until the basic timing machine states are ready to accept it.

When the microinstruction is a jump microinstruction, the machine logic under control of the machine state timing unit begins searching for the next microinstruction as soon as the contents of Q buffer register 369 are loaded into Q register 368. During the execution of a jump microinstruction, track head switching may be required and several word times may elapse before the correct word is located.

Data may be loaded into Q buffer register 369 whenever Q buffer flip-flop 358 is in its true state as determined by machine state timing unit 362. In addition to data being loaded into Q buffer register from memory or the recirculation of data, data may also be entered into this register from the keyboard of the control console as was described above.

The information in the microinstruction now residing in Q register 368 is decoded in various ways. Should the microinstruction call for working storage access, the eight least significant bits of Q register 368 may be transferred by way of data buses 852 and 853 to comparator 372 by way of address source select 371. Comparator 372 designates when a comparison is obtained with the contents of timing counters discussed in relation to FIG. 9. At that time, memory is then accessed. It will be remembered from the discussion of up/down counter 272 of FIG. 5 and index register (I2L) of that figure, that the contents of these registers may also be employed to access memory when transferred to comparator 372 of FIG. 10 by way of address source select unit 371.

As indicated in FIG. 10, address bits of a microinstruction in Q register 368 may also be transferred by way of bus 846 to A address select unit 262 of FIG. 4 to address a particular one of the A registers.

The eight most significant bits contained in Q register 368 specify an operation to be performed and are transferred to instruction decode unit 367. Upon decoding of the microinstruction by instruction decode 367, the respective execution controls 363 are set.

Certain of the bits contained in the operation code of the microinstruction specify specific adder and logic functions and these bits are transferred from Q register 368 to function decode unit 365 by way of function input selector 366.

A microinstruction decode of any particular microinstruction determines if the operation is to be in word, syllable, character, digit or bit form. This decode then enables the proper address compare signal to be activated. A particular determination as to the form is made by the sub-word address unit 364.

The micro decode unit then, as described in relation to FIG. 10, extracts information from the microinstruction to determine source and destination for data transfers; sequencing of particular sub-operations to be performed in conjunction with the timing machine states, adder function decode and sub-word addressing and source selection. In the case of literals within microinstruction, the Q register acts as a data source, in which case, the contents of the least significant digits of the microinstruction are serialized for data transfer by Q serializer 351 of FIG. 9 and transferred to input conductor 21 as described in relation to FIGS. 2 and 4 for transfer to respective destination registers.

E. Timing Machine States

As was described in the general description above, the processor of the present invention is one in which program instructions are implemented by a string of microinstructions at the circuit level. While individual microinstructions are normally executed during each word time, the implementation of a string of microinstructions for the implementation of a macroinstruction requires a change in the various machine states. The function of the machine state timing unit 362 is to control the timing of these operations which include microinstruction fetch, instruction decode, wait for execute time, microinstruction execute and track head switch delay.

Figure 11:
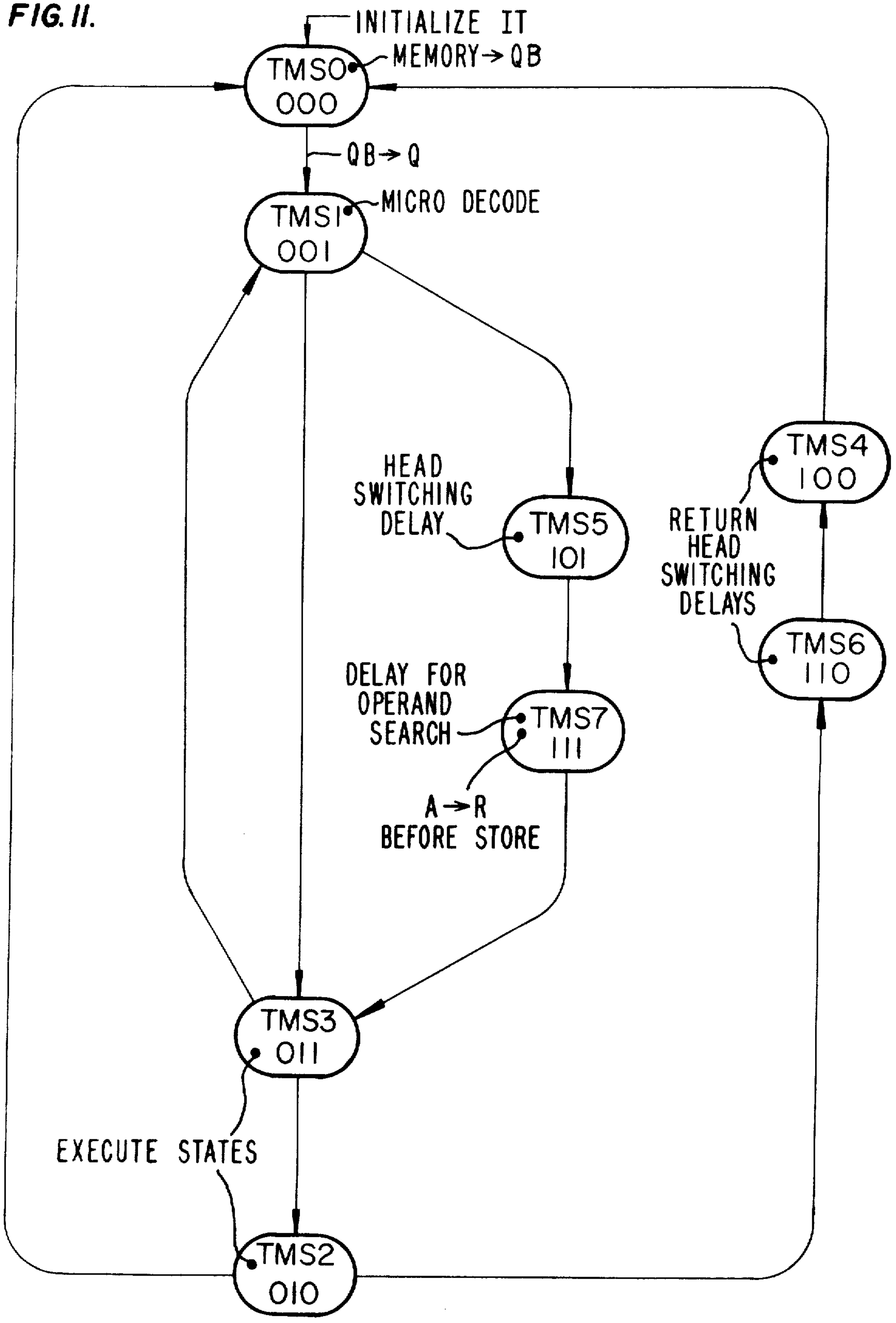
FIG. 11 is a diagram of the machine states of the present invention.

In order for each microinstruction to be executed, the timing machine states must cycle once in the processor of the present invention. There are eight such machine states which are indicated in FIG. 11.

The machine states hereinafter described will appear to be out of numerical sequence; however, they are determined by three flip-flops in machine state timing unit 362 which specify the eight different states. These states may be briefly described as follows. State 0 provides the waiting period for a transfer of the microinstruction from the Q buffer register to the Q register, which parallel transfer occurs at the time the processor changes from State 0 to State 1. State 1 is the time during which there is a Q register decode. States 2 and 3 provide the execution time for all microinstruction decodes. States 5 and 7 allow for time delay for memory microinstructions to accommodate memory accessing. States 4 and 6 provide the time delay to accommodate track head switching to allow the program to switch to the particular track containing the microinstruction to which a jump or branch has been specified.

The above described sequence will have five basic variations depending upon the type of microinstruction being decoded. The five types of microinstructions for which there is a specific variation are regular microinstructions, short jump microinstructions, head switch microinstructions, memory microinstructions and those microinstructions which require a synchronization of different functions during the sequencing through the various time machine states.

Regular Microinstructions

By definition, a regular microinstruction is one that requires one word time for a complete cycle of the timing machine states. The next microinstruction to be performed is located in the next word position of the micro portion of memory. If a string of regular microinstructions is being performed, the next microinstruction is being loaded into the Q buffer register while the former microinstruction is being executed. The regular microinstructions do not involve memory accesses, subroutine jumps or mechanical synchronization. Therefore, head switching delay times are not required and the only machine states which are employed are States 0, 1, 3 and 2.

When the machine states are initialized, the system returns to machine State 0, which is the idle state waiting for the proper time to transfer a microinstruction from Q buffer register to the Q register. When it is determined that the next microinstruction has been loaded into the Q buffer register at bit time 67 of the last word time, the system changes to machine State 1. At this time, the contents of the Q buffer register are transferred to the Q register in parallel. This state is true for one clock time or exists for one clock time and allows the microinstruction decode to be initiated. When a regular microinstruction is decoded, the state transition is then from State 1 to State 3.

Machine State 3 is an execute state for microinstructions with fixed time execution and for most address compare microinstructions. In this case, machine State 3 is true or in existence for 65 bit clock times. Execution time will vary depending upon the microinstruction. In the case of scan, isolate, shift or rotate operations, where an address compare is required, the execution state remains in machine State 3 until the address compare is completed. Upon completion of machine State 3, the system enters machine State 2.

The purpose of machine State 1 is to allow one clock time for the Q register decode signals to develop so that the instruction decode can determine if the microinstruction is a regular microinstruction or some other type. At this time, the instruction decode will determine what function is to be performed, the source and destination registers and the desired address if applicable. Q decode gating is always active as long as the microinstruction is in the Q register.

Machine State 3 begins the execution state for all microinstructions and machine State 2 completes the execution state for some address compare microinstructions and the isolate microinstructions.

Short Jump Microinstructions

A short jump microinstruction is one that may take more than one word time to execute. This microinstruction may require accessing of another word within the same memory track. It may not require track head switching. These microinstructions include a skip microinstruction and a conditional microinstruction. While these types of microinstructions require more than one word time for execution, they do not require a variation in the sequence of machine states.

Head Select Microinstructions

A head select microinstruction changes the address in the track, word and syllable portions of the program counter and, then, jumps to that address and executes the microinstruction fetched from that address. There is a two-word track head switch delay for these microinstructions. When this type of microinstruction has been transferred to the Q register, during the state change from State 0 to State 1, the machine State 1 will be active for one bit-clock time for microinstruction decode and the system will then change to machine State 3. Machine State 3 will be active for 65 bit-clock times during which any required data transfer will take place. The system then changes from machine State 3 to machine State 2, the latter of which will be active for only three bit-clock times and then there will be a change to machine State 6 as illustrated in FIG. 11. Machine State 6 is active for one word time during which any track head change will occur as needed. As illustrated in FIG. 11, the system then changes to machine State 4 to provide an additional one word time for changing head tracks if required whereupon the system returns to machine State 0. The system has now changed track heads on the disk memory and the new address in the program counter is compared with the timing counter until a comparison occurs at which time the new microinstruction is transferred to the Q buffer register.

Memory Access Microinstructions

The microinstructions used to access the disk memory are employed for the purpose of fetching, storing and searching disk memory as well as for loading data either from the R register into memory or from memory into the R register. Particular limitations involved with this type of instruction include the requirement that the address to be accessed in memory be added to the contents of base register 291 and the result compared with the upper limit setting (see FIGS. 5 and 6 respectively) to assure that the access is in the proper portion of memory. Should the limit be exceeded, then the system is switched into a recovery routine which is a separate microinstruction string.

Synchronized Microinstructions

Synchronized microinstructions like short jump microinstructions may take more than one word time to complete. They require synchronized signals to sequence the timing machine states which signals are usually generated from mechanical functions or conditions in the processor.

F. Repetitive Functions

Particular repetitive functions which are often employed have been implemented in the circuitry described above to the extent that single microinstructions are required to specify such functions. By way of example, certain of these functions will now be described although the following descriptions are not meant to be all inclusive. The functions which will be described are the search, scan and isolate functions.

Search Memory Function

The search memory function is one wherein a specified number of contiguous memory words are searched for a high, low or equal condition on a 1, 2, 4, or 8 character level. A result of this function will be to set flip-flop 206 of FIG. 4.

At the beginning of this function, the pattern which is to be sought in memory is stored in the R register 251 (see FIG. 4). A mask will be stored in the second word location of the working storage or A register 26. And the identifier length will be stored in the I1L index register 284 (see FIG. 5). The number of words to be searched will be specified by the contents of the I2 registers 281 and 282 of FIG. 5 and the starting memory address will be specified by the contents of the I3 index register which is actually a part of the first word location of the working storage.

When a comparison occurs, the K flip-flop 206 of FIG. 4 will be set; the word and track location of the located word will be specified by the contents of the I3 register and the particular digit of that word will be specified by the I1U register.

The function of the mask stored in the A2 register is to specify which bits of the scanned character or characters are to be compared during the search function.

Scan Function

During the scan function, the A registers, or working storage 26 of FIG. 2 are scanned for a high, low, or equal condition with respect to a digit or character depending upon the scan mode. Words are scanned from the least significant position to the most significant position. The contents of the I2L register will specify the last digit or character position to be scanned. The pattern for which a comparison is being sought is stored in the B register 31 which is shown in FIG. 2 and in detail in FIG. 6. The I1 index register will contain the address of the word currently being scanned. The I2L register will specify the last digit to have been scanned.

When a compare occurs, the K flip-flop 206 of FIG. 4 will be set and the I2U register will specify the last digit in which the comparison occurred within the desired scan field.

During a scan mask operation, the scan function is performed and the C register is employed to contain the mask for the pattern contained in the B register.

Field Isolate Functions

The field isolate functions are employed to select a field of digits from a specified word in the A (or R) register and to transfer that field to a specified destination in the A (or R) registers. The two major types of isolate functions are isolate left and isolate right.

Before the execution of the isolate function, the I2L register will be provided with contents to specify the least or most significant field of digits to be isolated. (The isolate left function selects the most significant field and the isolate right function selects the least significant field.) The I1 register will be provided with contents to specify the particular source (an A register or the R register).

G. Subroutine Entry and Return

Particular repetitive functions that can be specified by individual microinstructions were described above. However, it will be appreciated that the implementation of a macroinstruction may require a string of such microinstructions. In this respect, any macroinstruction or program can be viewed as a series of nested processes or subroutines. The manner in which a particular program or string of microinstructions can branch and enter a subroutine will now be described.

A subroutine is entered when a microinstruction has been executed which specifies such a branch whereupon the address currently in the program counter is entered into the stack registers in a first-in last-out manner as was described in relation to the stack registers which are shown in FIG. 2 and in detail in FIG. 5, and a new subroutine is selected by entering the corresponding location in memory, the address of which location is specified by the C and B registers taken together, or the I3 register. At the end of the subroutine, a return to the previous routine will take place by addressing that micro string in memory beginning at the instruction specified by the last address that was entered into the stack. A family of microinstructions is provided to specify both the beginning of the subroutine (enter) and the return from a subroutine (exit) which family includes a number of variations.

The specific microinstructions which make up the enter and exit families will now be described.

The basic enter microinstruction branches to the microinstruction at the address defined by the contents of the C and B registers and stores the program counter address into the top of the stack and the stack pointer is incremented by one.

The enter location microinstruction branches to the microinstruction at the address defined by the contents of the C and B registers except that the two most significant word positions of the program counter are ignored. The program counter address is stored in the top of the stack and the stack pointer is incremented by one.

The enter CB microinstruction branches to the microinstruction at the address defined by the contents of the I3 register. The contents of the C and B registers are entered into the top of the stack and the stack pointer is incremented by one.

The enter local CB microinstruction branches to the microinstruction at the address defined by the I3 register except that the two most significant word positions are ignored. The contents of the C and B registers are entered into the top of the stack and the stack pointer is incremented by one.

The enter-fail microinstruction branches upon the detection of an error to the microinstruction that is located in syllable 0, track 0, words 1, 2 or 3 of main memory, depending upon the type of error which occurred and enters the program counter into the top of the stack and the stack pointer is incremented by one.

The exit microinstruction fetches a microinstruction specified by the address last stored in the stack. After an exit function is executed, the stack pointer is decremented by one. The exit local microinstruction performs the same function as the exit microinstruction except the two most significant word bits are ignored.

EPILOGUE

The processor, thus described, has been provided with features to increase the number of applications for which it may be programmed without requiring an extensive amount of logic circuitry usually employed in most general purpose computers. Processors of this architecture may be manufactured in volume and then adapted to particular logic configurations as required by the applications of the user to whom the system is to be delivered. The processor of the present invention may be so configured and subsequently reconfigured by changing its microprogramming which microprogramming is employed to implement or interpret the macroinstructions of the user's program.

While the processor employs a disk memory, serial data transfer and other designed concepts which minimize the cost of the system, the features which have been described above allow a programmer a greater degree of flexibility in generating the various microprogram strings as required for those user applications.

While a disk memory is relatively slow when compared to magnetic core memories, instruction execution speeds are enhanced by the provision of an overlapping fetching of microinstructions and also by the provision of a sufficient number of working registers within the processor to store all of the operands that would be employed in a normal user application. By providing for branches to subroutines at the microprogram level, and return from such branching, the programmer is not required to build such subroutines into every set of microinstructions. Furthermore, the programmer is provided with the ability to dynamically adjust the size of the memory assigned to microinstructions. A particular advantage obtained by these features is that the microprogram generation is simplified, and even may be automated in the form of a compiler for employment in a larger general purpose computer.

While one particular embodiment of the present invention has been described, it will be understood by those skilled in the art that modifications and changes may be made therein without departing from the spirit and scope of the invention as claimed.

What is claimed is:

1. An improved serial operation microprogram reconfigurable data processor wherein macroinstructions are implemented directly by microinstructions comprising:

a disk memory for storing both macroinstructions and microinstructions input into said processor;

program control means connected to said disk memory including:

means for loading both macroinstructions and microinstructions into seperable portions of said memory in sequential strings of operation and whereby a dynamic boundary is established between said two types of instructions stored, means associated with said loading means for reading said stored macroinstructions and said stored microinstructions in the sequential order of operation in which they are stored, said reading means including means for fetching one of said microinstructions from said disk memory while decoding a previously fetched microinstruction, means associated with said reading means for implementing by microinstructions macroinstructions which have been read, data manipulation means connected to said disk memory for the manipulation of data according to macroinstructions stored in said disk memory as implemented by microinstructions stored in said disk memory; and said implementing means including means for branching to read other strings of microinstructions, including storage means for storing branch return addresses in a first in last out manner.

2. The apparatus of claim 1 wherein said program control loading means includes:

a single base register;

means for loading information into said base register for establishing the boundary between said macroinstruction portion and said microinstruction portion of said disk memory; and means associated with said base register loading means responsive to microinstruction storage requirements for automatically changing said base register boundary as said microinstruction storage requirements change.

3. The apparatus of claim 2 wherein said program control loading means also includes:

means associated with said base register for assigning positive address values to macroinstructions and negative address values to microinstructions respectively;

means associated with said assigning means for adding said assigned respective address values to the established boundary in said base register; and means associated with said adding means for designating each summation as the storage address of the respective macroinstruction or microinstruction.

* * * * *